United States Patent [19]

Nishimura

[11] Patent Number: 4,918,649

[45] Date of Patent: Apr. 17, 1990

[54] METHOD FOR GENERATING INSTRUCTIONS FOR INHIBITION SWITCH-OFF OF POWER AFTER POWER-OFF OPERATION

[75] Inventor: Kosuke Nishimura, Yamatokoriyama, Japan

[73] Assignee: Sharp Kabushiki Kaisha, Osaka, Japan

[21] Appl. No.: 218,258

[22] Filed: Jul. 13, 1988

Related U.S. Application Data

[62] Division of Ser. No. 585,377, Mar. 2, 1984, Pat. No. 4,768,162.

[30] Foreign Application Priority Data

Mar. 16, 1983 [JP] Japan .................................. 58-45349

[51] Int. Cl.[4] .......................... G06F 1/04; G06F 12/16; G06F 3/02
[52] U.S. Cl. ..................................... 364/900; 364/928; 364/946.2; 364/948.4; 364/948.6; 364/948.91; 364/944.61; 364/945; 364/945.7; 364/945.5
[58] Field of Search ... 364/200 MS File, 900 MS File

[56] References Cited

U.S. PATENT DOCUMENTS

| | | | |
|---|---|---|---|
| 4,096,560 | 6/1978 | Footh | 364/200 |
| 4,180,854 | 12/1979 | Walden et al. | 364/200 |
| 4,365,290 | 12/1982 | Nelms et al. | 364/200 |
| 4,669,059 | 5/1987 | Little et al. | 364/900 |

*Primary Examiner*—Raulfe B. Zache
*Assistant Examiner*—Emily Y. Chan

[57] ABSTRACT

An electronic apparatus includes power source for supplying a power, key input unit for inputting key instructions, a memory for memorizing the key instructions, a generator for generating a power off cancel instruction to be invalidated the power-off of the power supplied from the power source in response to at least one of the key instructions or at least one of the memorized instructions memorized by the memory, a detector for detecting the output of the power off cancel instruction generator, and a controller for controlling the power source in response to the output of the detector.

2 Claims, 3 Drawing Sheets

METHOD FOR GENERATING INSTRUCTIONS FOR INHIBITION SWITCH-OFF OF POWER AFTER POWER-OFF OPERATION

This application is a divisional of copending application Ser. No. 585,377, filed on Mar. 2, 1984 now U.S. Pat. No. 4,768,162.

BACKGROUND OF THE INVENTION

The present invention relates to an electronic apparatus and, more particularly, to an electronic apparatus fo protecting memory contents stored in the electronic apparatus from being erroneously erased by switching off a power.

Conventionally, in an electronic apparatus such as an electronic calculator, or a personal computer or the like, memory contents stored in the electronic apparatus are erased when a power is turned off. For example, if the power is switched off when calculating, all memory contents (or a part of memory contents) are erased immediately. Accordingly, the memory contents are protected not to be erased only when the memory storing the memory contents is backed up by the power.

Therefore, a tape may be put on a power OFF switch or guide cover may be provided on the power OFF switch so that no one except the operator may switch off the power OFF switch, whereby the power OFF switch cannot be activated and the power OFF switch is thus protected.

However, in the above methods, unexpected mistakes, program destruction, memory information erasure or interruption during calculation and measurement cannot be fully prevented.

SUMMARY OF THE INVENTION

In view of the above disadvantages, an object of the present invention is to provide an electronic apparatus which protects memory contents from being erroneously erased by switching off the power.

Another object of the present invention is to provide an electronic apparatus which can invalidate the unnecessary switching-off instruction of a power supply.

Another object of the present invention is to provide an electronic apparatus which generates an instruction (a power off cancel instruction) invalidating in response to a key input instruction or a memory instruction to a memory, the switch-off of power to be supplied to a driving circuit or the like, so that the apparatus can protect memory contents from being erroneously erased by invalidating the power switch-off function in response to the power-off cancel instruction.

Still another object of the present invention is to provide a method for protecting memory contents from being erroneously erased by switching off.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, an electronic apparatus comprises power means for supplying power and control means for controlling the power from the power means. The control means comprises generating means for generating an instruction for invalidating the switch-off of the power, means for detecting the output of the generating means, and means for controlling the power means in response to the detected output of the detecting means.

Further, the electronic apparatus is provided with key input means for inputting key instructions and memory means for memorizing the key instructions. The generating means generates the instruction in response to at least one of the key instructions or at least one of the memorized key instructions. The elctronic apparatus is the type which erases memory contents upon a power-off.

According to another embodiment of the present invention, a method for controlling power supply to an electronic apparatus of the type which erases memory contents upon a power-off, comprises the steps of generating instruction for invalidating the switch-off of the power, detecting the instruction, and controlling the power supply in response to the detected output of the instruction.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE INVENTION

Figure 1:
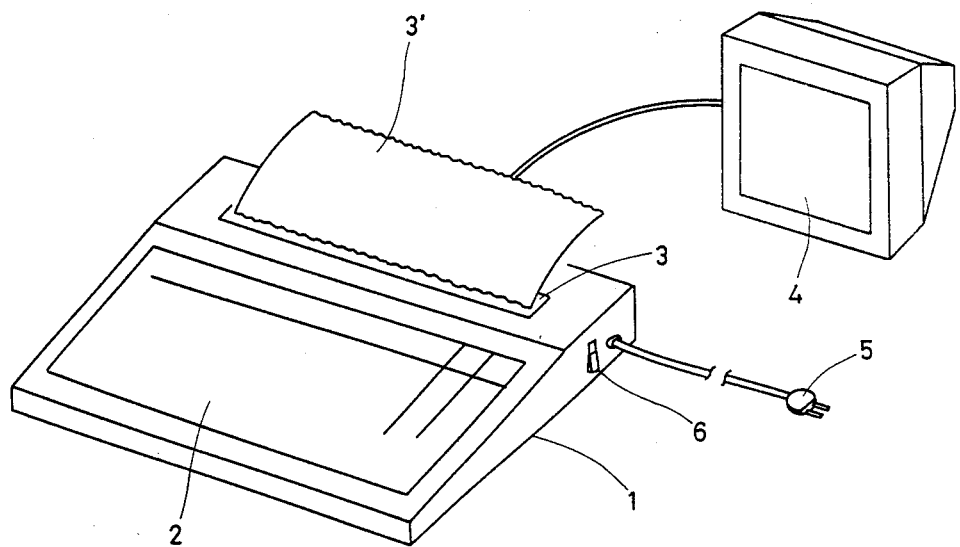
FIG. 1 is a perspective view of a personal computer of the present invention.

FIG. 1 is a perspective view of a personal computer of the present invention.

The personal computer 1 connected to a CRT display unit 4, comprises a key input unit 2, a printer 3 containing a recording paper 3', an AC plug 5, and a power switch 6.

Figure 2:
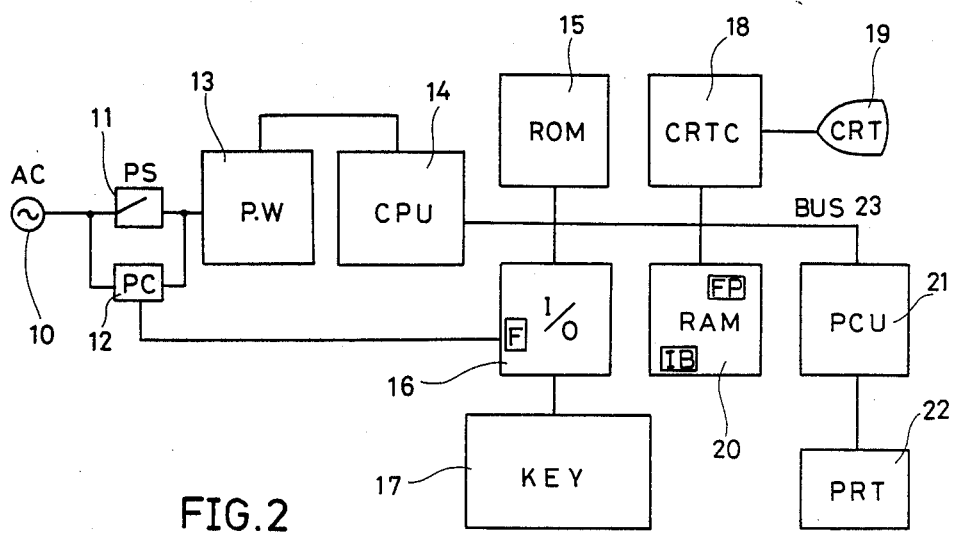
FIG. 2 is a circuit diagram of the personal computer connected to the CRT display unit.

FIG. 2 is a circuit diagram of the personal computer connected to the CRT display unit.

A power switch 11 and a power control circuit 12 are connected in parallel and are connected between a power source 10 and a power circuit 13. The power control circuit 12 is a switching element such as a TRIAC (a trielectrode AC switch) and is conducted by supplying a trigger only when the switching element is set ON.

The power circuit 13 is connected to a central processing unit (CPU) 14. The CPU 14 is provided with a read only memory (ROM) 15 and a random access memory (RAM) 20. The RAM 20 contains an input buffer IB and a flag FP as will be described later.

A CRT display unit 19 is controlled by a CRT controller 18, and is connected to the CPU 14 through the CRT controller 18 and a bus 23. A printer 22 is controlled by a printer controller 21, and is connected to the CPU 14 through the printer controller 21 and the bus 23. An input/output device 16 is connected to a key input unit 17 and to the CPU 14 through the bus 23. The input/output device 16 is provided with a flip-flop F as will be described later.

The power control circuit 12 is controlled in response to the set output of the flip-flop F of the input/output device 16.

The set or reset of the flip-flop F of the input/output device 16 is controlled in response to key input instructions inputted from the key input unit 17, or the judged output of instructions (commands) within a program stored in a memory.

The power control circuit 12 is driven by setting the flip-flop F of the input/output device 16. In other words, the power control circuit 12 is switched on by setting the flip-flop F of the input/output device 16. If the flip-flop F is set and then the power control circuit 12 is energized, the power supplied from the power source 10 is applied to internal circuits of the apparatus such as the power circuit 13 through the power control circuit 12.

Even if the power switch 11 is switched carelessly or mistakenly off by the operator, the power is supplied into the internal circuits of the apparatus by setting the flip-flop F without the power OFF instruction, so that the power OFF instruction is invalidated.

Figure 3:
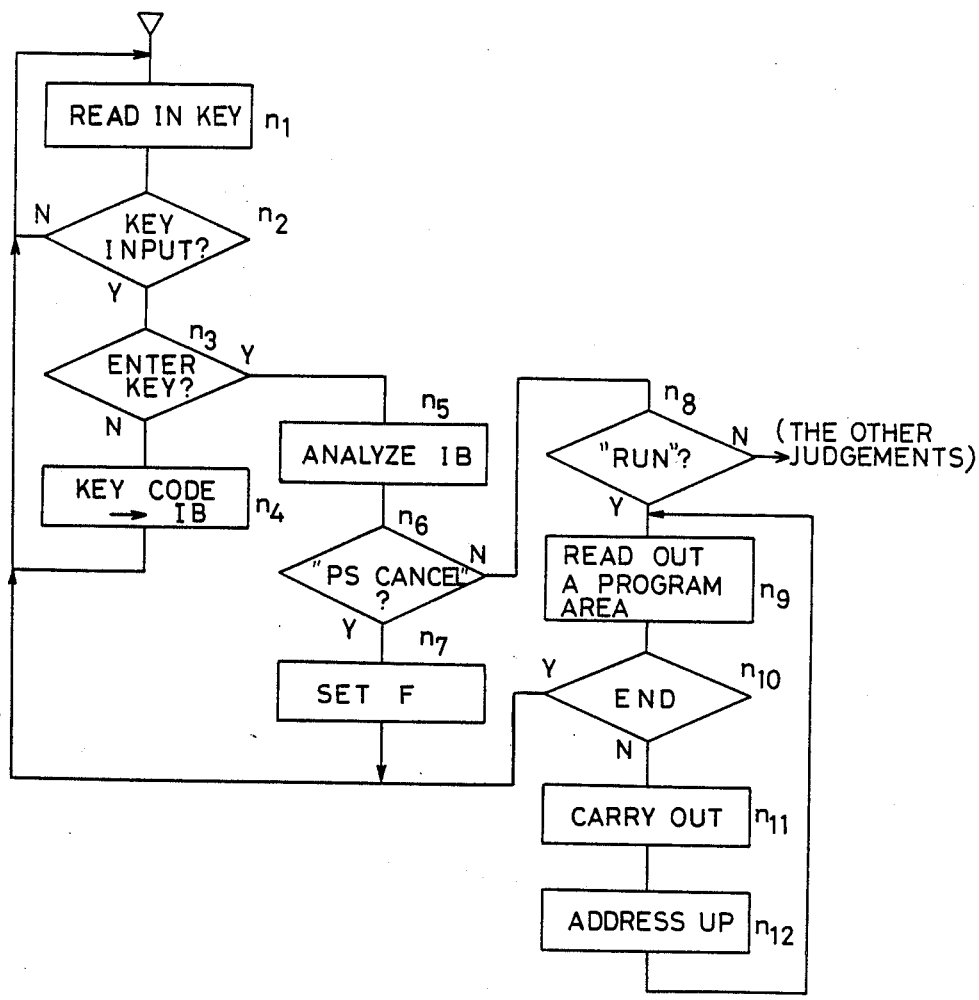
FIG. 3 is a flow chart of explaining the operation for controlling the power.

FIG. 3 is a flow chart of explaining the operation for controlling the power.

Operations invalidating the power OFF instruction are offered by the key input instruction and the program instruction (or the program command) as follows, respectively.

The above key input instruction may be one of instructions inputted by the key input unit 17 when programming, and the key input instruction is entered into a program as programming contents by actuating an "ENTER" command key provided on the key input unit 17.

The program instruction is one of instructions within a program stored in memory means. The program is carried out by actuating a "RUN" command key provided on the key input unit 17.

When the power OFF instruction is invalidated by the key input instruction, the operations are as follows.

Step n1:
Key inputs are read in.
Step n2:
The presence or absence of the key inputs is judged.
Step n3:
This step is used to check whether the key actuated is the "ENTER" command key. If the "ENTER" command key is operated, the step is forwarded to step n5. If it is detected that one of the other keys except the "ENTER" command key on the key input unit 17 is depressed, the step is forwarded to step n4.
Step n4:
Key input alphabets or numerals forming the single key input instruction (referred to as key input contents) are inputted into the input buffer BF within the RAM 20 region, and the step is returned to the step n1.
Step n5:
The key input contents stored in the input buffer IB within the RAm 20 are analyzed.
Step n6:
The analyzed contents of the key input contents stored into the input buffer IB are judged. For example, this step is used to judge whether the analyzed contents are a power OFF cancel instruction for invalidating the power OFF instruction. In this embodiment of the present invention, the power OFF cancel instruction is applied by a "PSCANCEL" command. If the analyzed contents are the "PSCANCEL" command, the step is forwarded to step n7. If the analyzed contents are not the "PSCANCEL" command, the step is forwarded to step n8.

Step n7:
If the analyzed contents of the input buffer IB are the "PSCANCEL" command (IB=PSCANCEL), the flip flop F within the input/output device 16 is set. In other words, the flip-flop F within the input/output device 16 is set in response to the judged output of the step n6.

The output of the flip-flop F is supplied to the power control circuit 12 as shown in FIG. 2, and the power control circuit 12 is switched on, so that the power is not switched off and the power OFF instruction is thereby invalidated even when the power switch 11 is switched off. The power is supplied the internal circuits such as the power circuit 13 via the power control circuit 12.

If the "PSCANCEL" command which functions as the power off cancel instruction is entered into the program in advance when programming, the power is not switched off, so that the memory contents are protected from being erroneously erased.

The "PSCANCEL" command may be inputted by actuating keys corresponding to each of the alphabets, or one key.

When the power OFF instruction is invalidated by the program command in the program stored in the memory, for example, during the program run, the operations are as follows.

Step n8:
This step is used to judge whether the contents of the input buffer IB inputted by a key or keys are the "RUN" command. If the "RUN" command is inputted, the step is forwarded to step n9. If the "RUN" command is not inputted, the step is forwarded to the other judgment.
Step n9:
Program contents programmed previously are read out from a program area.
Step n10:
This step is used to judge whether an end code is present. If the end code is present, the operation is returned to the step n1. If the end code is absent, the step is forwarded to step n11.
Step n11:
If the end code is absent, the program contents are run and carried out. When the "PSCANCEL" command as the power off cancel instruction is in the program contents, the flip-flop F within the input/output device 16 is set and the program control circuit 12 is controlled in response to the output of the flip-flop F.
Step n12:
The program is carried out by addressing up in sequence.

To cancel the power OFF cancel instruction, the "PSCANCEL" command, a command for resetting the flip-flop F, for example, "PSENABLE" command, is judged to be inputted, so that the power control circuit 12 is switched off.

The "PSENABLE" command may be entered into the program in the same way of the "PSCANCEL" command, but is not shown in FIG. 3.

In the above methods, the power control circuit 12 is connected to the power circuit 13 in parallel. But, in the other method as another embodiment of the present invention, the power switch can be eliminated, and the power is controlled by actuating a power ON key and a power OFF key, or a specific key. Therefore, the key input instruction or the program instruction can be controlled to invalidate the operation of the power OFF key.

Figure 4:
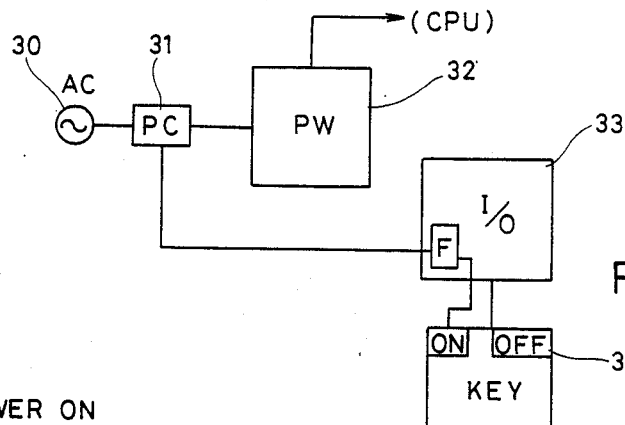
FIG. 4 is a circuit diagram of a personal computer according to another embodiment of the present invention.

FIG. 4 is a circuit diagram of a personal computer according to another embodiment of the present invention.

Figure 5:
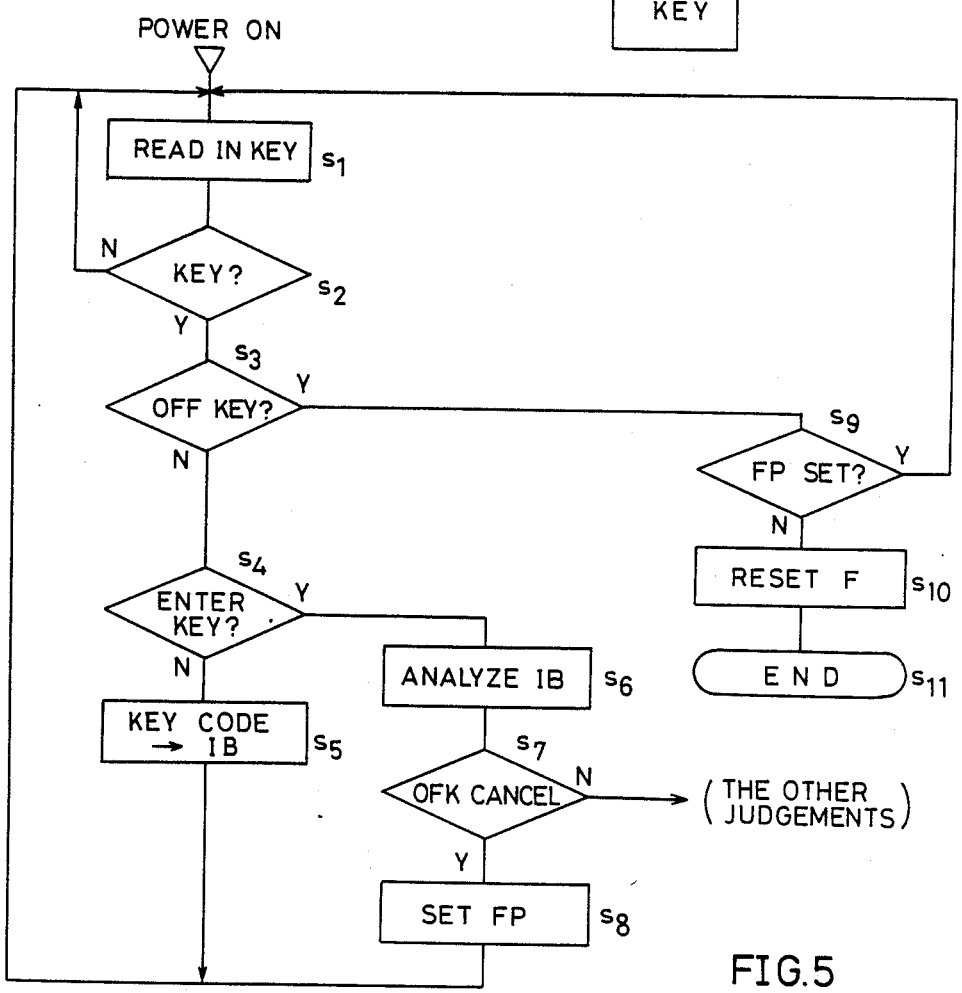
FIG. 5 is a flow chart of explaining the operation of FIG. 4.

In another embodiment of the present invention, the power is controlled by actuating the power ON and OFF keys FIG. 5 is a flow chart of explaining the operation of FIG. 4.

In FIG. 4, 30, 31, 32, 33, and 34 designate a power source, a power control circuit, a power circuit, an input/output device, and a key input unit. Other circuits except the above circuits are same as shown in FIG. 2. The input/output device 33 is provided with a flip-flop F. The key input unit 34 is provided with a power ON key and a power OFF key.

The supply of the power is controlled only by actuating the power control circuit 31. This is an example of type controlling the power by actuating the power ON key and the power OFF key.

First, the power ON key is switched on, and the power is supplied to the circuits of the apparatus. The flip-flop F within the input/output device 33 is set by actuating the power ON key.

Step s1:
Key inputs are read in.

Step s2:
The presence or absence of the key inputs is judged.

Step s3:
This step is used to judge whether the power OFF key is depressed. If the power OFF key is depressed, the step is forwarded to step s9.

Step s4:
This step is used to judge whether the "ENTER" command is inputted. If the "ENTER" command is inputted, the step is forwarded to step s6. If the "ENTER" command is not inputted, the step is forwarded to step s5.

Step s5:
Key input alphabets or numerals forming the single key input instruction (referred to as key input contents) are inputted into the input buffer IB within the RAM 20 regions, and the step is returned to the step s1.

Step s6:
The key input contents in the input buffer gB within the RAM 20 are analyzed.

Step s7:
The analyzed contents of the key input contents stored into the input buffer gB are judged. For example, this step is used to judge whether the analyzed contents are the power OFF cancel instruction for invalidating the power OFF instruction. In this embodiment of the present invention, the power OFF cancel instruction is applied by "OFKCANCEL" command. If the analyzed contents IB are the "OFKCANCEL" command, the step is forwarded to step s8. If the analyzed contents do not meet the "OFKCANCEL" command, the step is forwarded to the other judgments.

Step s8:
When the analyzed contents of the key input contents stored into the input buffer IB are the "OFKCANCEL" command (IB=OFKCANCEL), the flag FP within the RAM 20 is set. In the other words, the flag FP within the RAM 20 is set in response to the judged output of the step s7. After the flag FP is set, the step is forwarded to the step s1.

Step s9:
When the OFF key is depressed in the step s3, this step s9 is used to judge whether the flag FP is set.

If FP=1 (the flag FP is set), the step is returned to the step s1, so that the power OFF instruction is invalidated and the instruction of the power OFF key is invalidated by the "OFKCANCEL" command.

If FP=0 (the flag FP is reset), the step is forwarded to step s10.

Step s10:
The flip-flop F is reset.

Step s11:
The power is switched off.

In the above another embodiment of the present invention, the power is not switched off by setting the flag FP within the RAM 20 and the flip-flop F within the input/output device 33. To cancel the power OFF cancel instruction, the "PSCANCEL" command, a command for resetting the flap FP is judged to be inputted, so that the power control circuit 31 is switched off by resetting the flip-flop F after the power OFF key is depressed.

In the above embodiments, the present invention is applied to the personal computer, but can be applied to an electronic calculator, or a measurement device or the like.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for controlling power supply to an electronic apparatus wherein memory contents are erased upon a power-off, comprising the steps performed by said electronic apparatus, subsequent to a power-off operation resultant from octuation of a power switch, of:

generating an instruction for inhibiting a switch-off of the power to said electronic apparatus after the power-off operation;

detecting the inhibiting instruction developed by the step of generating; and controlling the power supply to continue supply of power to said electronic apparatus in response to the detected output of said inhibiting instruction.

2. The method of claim 1 wherein said instruction for inhibiting is introduced into said device by an operator.

* * * * *